United States Patent Office 2,976,902
Patented Mar. 28, 1961

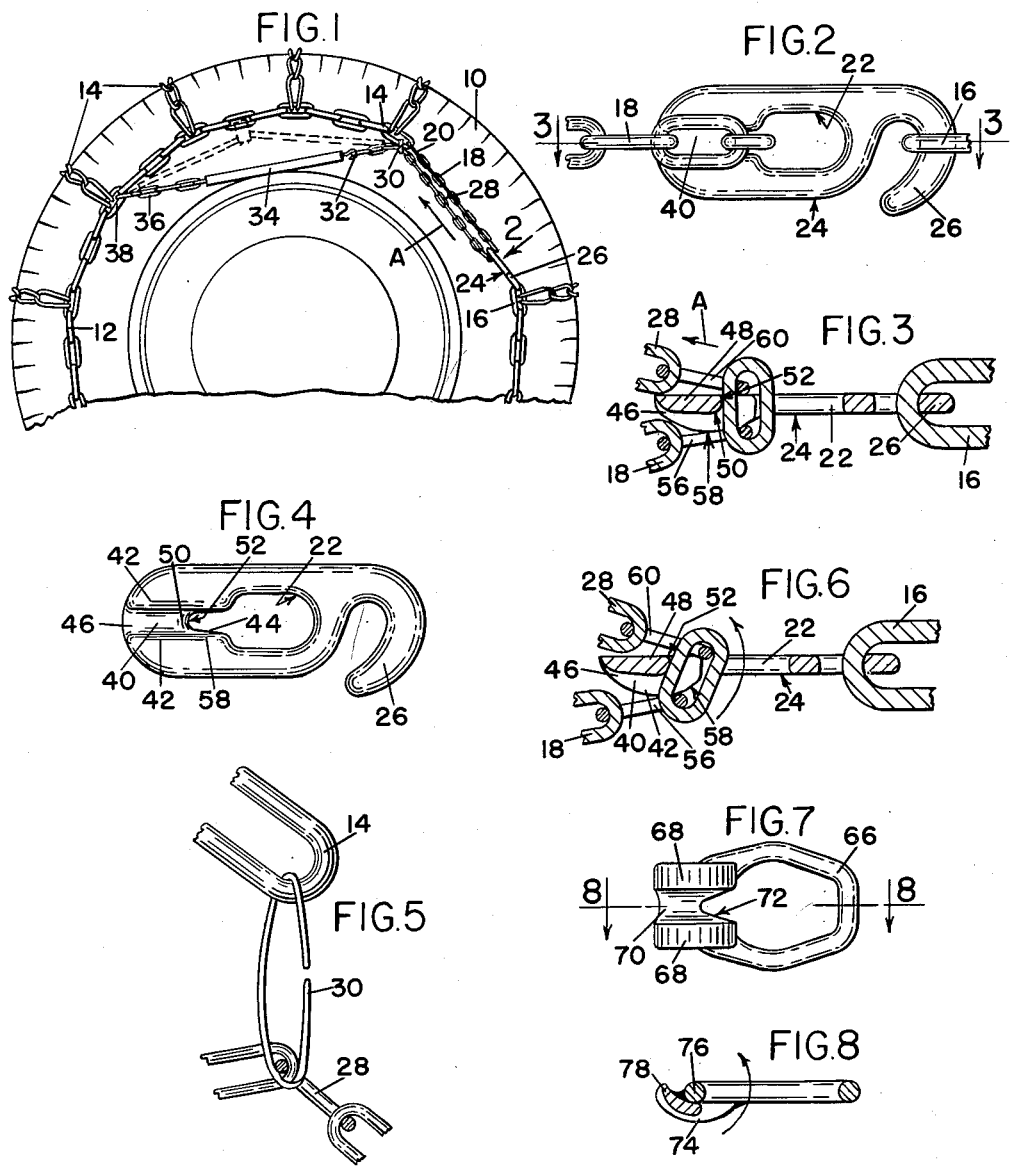

2,976,902
AUTOMATIC TIGHTENER FOR TIRE CHAINS
Henry St. Pierre, 50 Frank St., Worcester, Mass.
Filed Apr. 15, 1958, Ser. No. 732,758
1 Claim. (Cl. 152—217)

This invention relates to a new and improved tire chain particularly adapted for vehicles, such tire chains being used to increase wheel traction in snow, ice, mud, etc.

The principal object of the present invention resides in the provision of a new and improved take-up device by which the tightness of the chain on the tire is automatically adjusted as the tire rotates in use, to provide for an optimum degree of tightness of the chain. It is well known in the art that tire chains should not be applied to a tire in too tight a relation thereto because this increases wear of the tire and pounding of the chain on the pavement; tire chains should be applied to tires in a relatively snug condition but loose enough so that the entire chain gradually travels about the tire and does not therefore apply all of the wear at certain locations but distributes the area of wear over the entire tire. With this degree of tightness, the optimum driving conditions are encountered both as to comfort and convenience and as to length of life of the tire chain.

The usual "spreaders" used with tire chains ordinarily apply too great a degree of tension to the chain and prevent the provision of optimum conditions, but on the other hand some form of tightening means is found to be convenient in order for the easier application of the chain to the wheel, and the primary purpose of the present invention resides in the provision of a new and improved device for this purpose.

Further objects of the invention include the provision of an automatic chain tightener for the purpose described, comprising a relatively short length of relatively small chain passing through and reversed with respect to a new and improved device and forming an end connection between the two ends of the outer side chain of the tire chain, said device being made in such a way as to provide that this small chain may pass through it in one direction only, there being resilient or spring means applied to one end of said small chain in order to create a constant tension thereon, whereby said small chain is urged to travel through the device in a direction to tighten the side chain of the chain, i.e. to reduce the circumferential dimension thereof, said novel device preventing travel of said small chain in the opposite direction.

Other objects and advantages of the invention will appear hereinafter.

Reference is to be had to the accompanying drawings, in which

Fig. 1 illustrates the invention applied to the wheel of a vehicle;

Fig. 2 is an enlarged view illustrating the new and improved device;

Fig. 3 is a section on line 3—3 of Fig. 2;

Fig. 4 is a plan view of the device per se;

Fig. 5 is a detail view illustrating an additional support for the chain tightener;

Fig. 6 is a view similar to Fig. 3 but illustrating the action of the small chain in passing through the device;

Fig. 7 is a plan view of a modified device; and

Fig. 8 is a section on line 8—8 of Fig. 7.

In Fig. 1 there is shown a conventional tire at 10 and on this tire there is disposed the side chain 12 of a tire chain having the cross chains 14 which may be of conventional design. At the opposite side of the tire, there is another side chain which may be connected at its ends in any way.

The end links of side chain 12 are indicated herein at 14 and 16. The automatic chain tightener which forms the subject matter of the present invention is utilized to quickly and easily connect these end links as well as to automatically tighten the chain as will be described hereinafter.

A small chain having a run indicated at 18 is connected at one end in any way desired as by a hook or a closable link 20 to the end link 14 of the side chain. This small chain 18 passes through an opening 22 in a device generally indicated at 24 which is provided with a hook 26 disposed in the side chain end link 16. The small chain is reversed after passing through the opening 22 as is indicated by the run at 28, thus providing the pair of runs indicated at 18 and 28. The run 28 passes through a ring 30 which may be secured to link 14 and then being connected at 32 to the end of a tension spring 34.

Tension spring 34 is provided with a connection generally indicated at 36 for application to a link in the side chain as indicated at 38. There may be if desired other loops or rings such as 30 which may engage with other links in the side chain to force the spring 34 to conform more or less in a shape to the circular disposition of the side chain in the tire. However, in general the force of the spring is exerted on a chord of the circle and tends to pull run 28 of the small chain through the opening 22 of the device 24.

The device 24, besides having the hook 26, which is intended to be closed in link 16, and opening 22, is provided with a face groove 40 and two projecting rounded shoulder-like portions 42 one at either side of the groove and essentially forming the groove. This groove leads into the opening 22 through a narrow neck 44 and the bottom of the groove merges at 46 into the flat rear side 48 thereof as clearly shown in Figs. 3 and 6. At the opposite end of groove 40 where it merges into narrow opening 44, it is rounded off on a short radius as indicated at 50, this forming a corner at 52 with the flat side 48.

With the small chain disposed through the opening 22 and reversed as shown in Fig. 3, a pull on the chain run 18 in the direction away from the device 24 is not possible because of the engagement of the chain with the flat side 48; and the relative sharp corner 52 also helps to latch the chain. So long as there is tension on the run 18, the chain cannot be pulled in this direction.

However, with the spring 34 exerting a pull in the direction of arrow A in Figs. 1 and 3, the chain link which is indicated at 56 rides up and over the curved portion 58 formed by the shoulder portions 42 and link 56 is then pulled over, by the action of the spring, into the position of the link 60, thus in effect shortening the length of the run 18 of the small chain which directly connects the links 14 and 16 of the ends of the side chain 12.

This action clearly tightens the chain as a whole by reducing the length of the side chain 12. However, due to the nature of the device, too great an exertion on the chain to make it too tight is impossible and it has been found that this apparatus automatically maintains the chain as a whole in exactly the optimum combination of tightness on the wheel. The automatic action occurs during the first few hundred yards of operations on the vehicle and the action of the small chain is somewhat in the nature of a ratchet acting under spring power which maintains the device in the desired condition as above described without any attention or manipulation necessary to be made on the part of the operator.

The narrow neck 44 receives the chain link connecting links 56 and 60, and it is pointed out that in each step-by-step operation of the device, a distance of two links must be traveled since the link between links 56 and 60 cannot take the place of or lie substantially flatly against surface 48.

In Figs. 7 and 8 there is shown a modified device which has a loop 66 instead of a hook 26 but this modification also provides the shoulders 66 forming the groove 70 and reduced portion 72, together with the curved surfaces 74 which are comparable to those at 58 and provide for the passage of the chain in the direction of the arrow in Fig. 8 where the end of the loop 66 at 76 and the end 78 of the shoulder portion 68 prevents the chain from traveling in the opposite direction.

It will be appreciated that the spring 34 is flexible and may be received in a ring 30 attached to any side wheel link between that at 14 and that at 38. However, a tubular member may be used to receive and protect the chain, in which case the tubular member being rigid is not susceptible to such a construction, but otherwise the inventive concept and the action of the device is the same as above described.

Having thus described my invention and the advantages thereof, I do not wish to be limited to the details herein disclosed, otherwise than as set forth in the claim, but what I claim is:

Traction chain for vehicles comprising side chains and cross chains, and automatic means connecting the ends of one side chain and applying tension thereto for maintaining tension on the chain, said automatic means including a link chain disposed between the ends of the side chain, resilient means normally urging the link chain in traction chain tightening direction, and means latching the link chain in traction chain tightening position, said latching means acting uni-directionally to provide for motion of the link chain in the tightening direction only, and comprising a shouldered loop through which the link chain extends, the link chain being reversed at the loop, the loop including rounded surfaces at one side only thereof on the shoulders to guide the link chain through the loop in traction chain tightening direction, the other side of the loop being flat and engaging the link chain and preventing passage of the link chain in the opposite direction.

References Cited in the file of this patent

UNITED STATES PATENTS

| | | |
|---|---|---|
| 1,974,833 | Reyburn | Sept. 25, 1934 |
| 2,328,808 | Holtz | Sept. 7, 1943 |
| 2,500,373 | O'Connor | Mar. 14, 1950 |
| 2,562,798 | Kovatch et al. | July 31, 1951 |